United States Patent Office 3,685,966
Patented Aug. 22, 1972

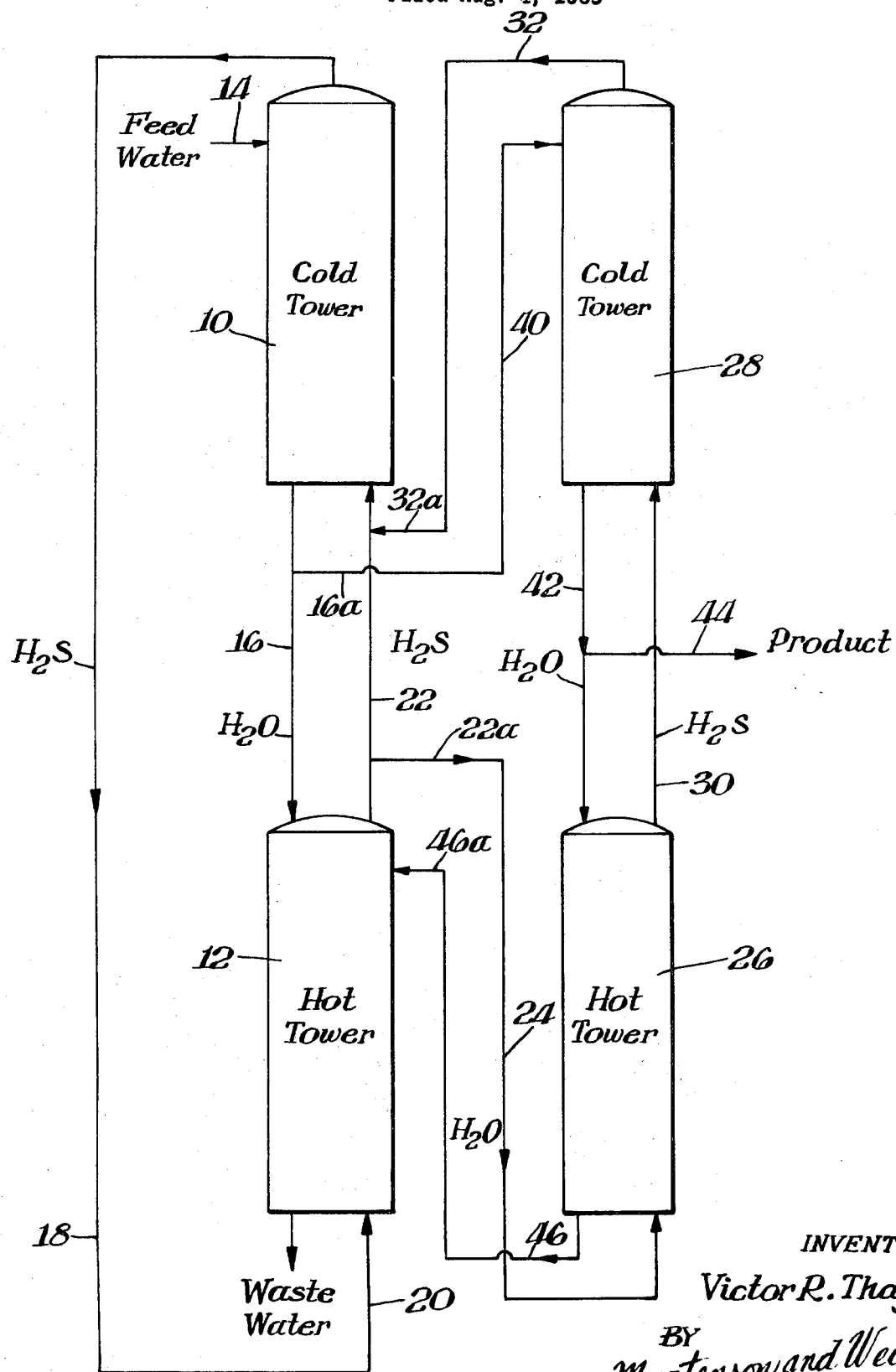

3,685,966
PRODUCTION OF HEAVY WATER
Victor R. Thayer, R.D. 3, Newark, Del. 19711
Filed Aug. 4, 1969, Ser. No. 847,306
Int. Cl. C01b 5/02, 17/16
U.S. Cl. 423—580                    8 Claims

ABSTRACT OF THE DISCLOSURE

Heavy water is concentrated by dual temperature exchange between hydrogen sulfide and water. The concentration is accomplished in a multi-stage system, utilizing process parameters requiring a higher temperature hot zone, a reduced recovery of the product from the feed water relative to the recovery theoretically possible, and limiting the increase in concentration per stage to a factor of less than 4. These operating parameters permit a substantial reduction in capital cost of the system.

BACKGROUND OF THE INVENTION

A method of concentrating isotopes by chemical exchange at two different temperatures is disclosed in U.S. Pat. 2,787,526 patented in the name of Jerome S. Spevack on Apr. 2, 1957 and assigned to the U.S. Government. The method disclosed therein has been used to concentrate deuterium by exchange of hydrogen isotopes between hydrogen sulfide and water to obtain deuterium oxide, otherwise known as heavy water, in concentrated form. The procedure as disclosed and used comprises four basic steps as follows:

(1) Passing liquid water countercurrent to gaseous hydrogen sulfide in an exchange tower kept at a selected low temperature (the cold tower), wherein deuterium is preferentially transferred from hydrogen sulfide to water;

(2) Heating water and hydrogen sulfide to a selected higher temperature in apparatus designed for transfer of heat;

(3) Passing liquid water and gaseous hydrogen sulfide countercurrent to each other in an exchange tower kept at said higher temperature (the hot tower), wherein deuterium is preferentially transferred from water to hydrogen sulfide;

(4) Cooling both fluids in apparatus designed for transfer of heat, returning hydrogen sulfide to the cold tower for recycling first through the cold tower then through the hot tower, counter-currently to the water, the water being partially depleted of its deuterium content and being passed to waste. By proper adjustment of the rates of flow of water and hydrogen sulfide there is caused to occur a transport of deuterium downwardly in the cold tower and upwardly in the hot tower so that deuterium becomes concentrated in both fluids, reaching a maximum in the streams flowing countercurrently between the two towers. As noted in U.S. Pat. 2,787,526 the respective cold and hot structures can if desired, be installed in a single tower rather than as two separate towers. The towers are normally under pressure of about 300 p.s.i.

Because of the scarcity of deuterium in nature, shown by the fact that natural water contains only one atom of deuterium for about 7000 atoms of "light hydrogen" (protium), large quantities of water must be processed to obtain significant quantities of heavy water. Further, the cost of building and operating equipment to carry out the process as above described in a major obstacle preventing or inhibiting the large scale use of heavy water. Heavy water is one of the best materials available to slow down or moderate neutrons in nuclear reactors but because of its high cost reactor designers often choose moderators which, although less efficient than heavy water, are less costly.

Two manufacturing plants, one near Dana, Ind., and the other near Aiken, S.C. (the Savannah River Plant), have produced heavy water using the above described countercurrent exchange processes. A detailed description of the process operating conditions of these plants including their flow diagrams (flow sheets) together with a general description of the theory of the process are set forth in a report published by the U.S. Atomic Energy Commission designated "Research and Development Report" DP–400 by J. F. Proctor, W. P. Bebbington and V. R. Thayer. This report was published in 1959.

The Dana and Savannah River Plants for producing heavy water began operation in 1952. An article entitled "Economics of Heavy Water Production" by J. F. Proctor and V. R. Thayer appears on pp. 53–61 of the magazine Chemical Engineering Progress, vol. 58, No. 4, April 1962. A revised set of process operating conditions, i.e., flow sheet, based upon experience gained in operating the Dana and Savannah Plants is published. Among the several process parameters set forth on this published flow sheet are the following:

(1) hot zone (hot tower) temperature—130° C.;
(2) relative recovery of deuterium oxide expressed as a percent of that theoretically possible—93%;
(3) enrichment per stage expressed as a factor.
   (a) first stage—4,
   (b) second stage—6, the 4 and the 6 indicating a four-fold and a six-fold increase in deuterium oxide over that of the respective input fluid.

As may be noted from a study of the process theory and operating conditions given in the AEC Report DP–400, in the region of 130° C. an increase of one degree centigrade in the temperature of the hot zone increases the yield of heavy water of the system by about 0.9%. Nothing is said in the report with respect to the other operating parameters, i.e., relative recovery and enrichment ratio. The report simply records numerical values of the operating parameters as established in actual operation of the two plants. These values do not differ greatly from those values set forth in the Chemical Engineering Progress article by Proctor and Thayer. The Proctor and Thayer flow sheet permits a significant reduction in capital cost of the system by the use of an improved method for heat recovery. However, the Proctor-Thayer flow sheet did not propse any changes in the operating parameters.

Perhaps one reason for this utter lack of modifying existing process parameters is that it is not obvious that their change would lead to any substantial benefits. Thus, if the temperature of the hot zone is raised and if the remaining two parameters (relative recovery and enrichment per stage) are left unchanged, the improved yield of 0.9% per degree centigrade is hardly enough to justify the cost of the additional heat and heat exchange equipment required to achieve the higher operating temperature. In like manner, a change in percent recovery does not produce by itself any significant changes or reduction in the capital cost of the system. Finally, a change in enrichment per stage factor from the specified value of four to either three or five by itself, produces no significant reduction in capital cost. For these reasons, the value of the parameters set forth during actual operation have in the past been taken to be optimum or so near optimum that further process optimization will not yield savings of practical significance.

Accordingly, it is an object of this invention to provide a novel process of producing heavy water which process permits a reduction in the capital cost of the system employed for the process.

Another object of this invention is to obviate many of the disadvantages inherent in existing process operating conditions for the production of heavy water by the chemical exchange at different temperatures of deuterium and hydrogen between water and hydrogen sulfide.

DESCRIPTION OF THE PREFERRED EMBODIMENT

In a preferred embodiment of this invention the deuterium isotope of hydrogen is concentrated utilizing a new set of process parameters for the otherwise conventional process of chemical exchange between water and hydrogen sulfide at different temperatures. By simultaneously increasing the operating temperature of the hot zone of the exchange system, and limiting the recovery of enriched deuterium from the feed water to a factor of significantly less than 92% of that recovery theoretically possible, a substantial reduction in the cost of the capital equipment necessary to operate such a process can be achieved. If at the same time the enrichment per stage is reduced to a factor of less than four, a further savings in capital cost is attained.

BRIEF DESCRIPTION OF THE DRAWINGS

The invention, both as to its apparatus and method, as well as additional objects and advantages thereof, will best be understood from the following description when read in connection with the accompanying drawings in which the figure is a block schematic flow diagram of a system capable of performing the chemical exchange process for the extraction of deuterium from feed water.

DESCRIPTION OF THE PREFERRED EMBODIMENT

A typical system for the production of heavy water is as seen in the figure. This system operates by the conventional process of countercurrent exchange at different temperatures of the deuterium isotope between water and hydrogen sulfide. To achieve this exchange, a simplified two stage system is illustrated. The first stage system includes a cold tower 10 and a hot tower 12 both suitably packed with the sieve or bubble plates as is conventionally done. Feed water from a suitable supply is introduced as denoted by the arrow 14 in the upper portion of the cold tower 10 which is typically operated at a 30° C. temperature. This feed water passes downwardly through the line 16 into the upper portion of the hot tower 12 and then passes out the bottom of the hot tower as waste water. Simultaneously hydrogen sulfide is circulated through the line 18 and passed upwardly as denoted by the arrow 20 through the hot tower 12 countercurrently with the downwardly flowing feed water up through the line 22 into the lower portion of the cold tower 10 and out the top of the cold tower 10 for recirculation. Between the hot and cold tower a portion of the upwardly flowing hydrogen sulfide is removed from the line 22 at 22a and introduced into the lower portion of the hot tower 26 which together with a cold tower 28 comprises the second stage of the system. This hydrogen sulfide somewhat enriched passes upwardly out of the hot tower 26 through the line 30 and enters the lower portion of the cold tower 28. The enriched hydrogen sulfide passes out of the top of the cold tower 28 through the line 32 to be reunited at 32a with the hydrogen sulfide gas entering the lower portion of the tower 10. In like manner, a portion of the enriched portion of the water passing downwardly through the line 16 is taken at 16a from the cold tower 10 and is introduced into the upper portion of the cold tower 28 of the second stage through the line 40. This enriched water passes downwardly through the cold tower 28 where it is further enriched by contact with the upwardly moving enriched hydrogen sulfide gas. This enriched water leaves the lower part of the cold tower 28 and passes downwardly through the line 42 for introduction into the upper part of the hot tower 26. Prior to introducing to the hot tower 28 the product in the form of water enriched in deuterium may be removed through the line 44. That enriched water which passes on downwardly through the hot tower 26 has additional deuterium extracted therefrom and the remainder passes out from the lower portion of the hot tower 26 through the line 46 where it is reintroduced into the first stage at the upper portion of the hot tower 12 at 46a.

As noted, for the sake of simplicity of illustration, the two stages of gas-liquid contacting towers are greatly simplified and exclude heat exchange equipment, recirculating pumps, strippers and the other known necessary equipment to operate the tower. However, for the sake of a complete description, it may be noted that the separation or concentration of the deuterium isotope to produce heavy water is brought about by the chemical exchange reaction expressed by the equation $$H_2O + HDS = HDO + H_2S$$

The equilibrium constant of this chemical reaction which takes place in the liquid phase between water and hydrogen sulfide dissolved therein is expressed by the equation

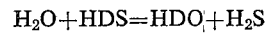

$$K_x = \frac{HDO_1 \text{ times } H_2S_1}{H_2O_1 \text{ times } HDS_1}$$

where $HDO_1$ and $H_2O_1$ are the mol fractions of these components in the liquid phase and $H_2S_1$ and $HDS_1$ are mol fractions dissolved in the liquid phase. Since this equilibrium constant varies with temperature, the basis for the separation of the deuterium from normal hydrogen or protium exists. Because of the differences in this equilibrium constant, the concentration HDO at lower temperatures is greater than at the higher temperatures. Hence, by bubbling the hydrogen sulfide gas up through the tower countercurrently the feed water which is trickling down through the tower (and two such towers are created as in the prior art, one being maintained at a high temperature and the other being maintained at a cold temperature), there is a net transfer of deuterium from the hydrogen sulfide gas to the feed water in the cold tower and conversely from the feed water to the hydrogen sulfide gas in the hot tower. If now some of the material between the towers is withdrawn, the withdrawn portion, whether it be liquid or gas, will have a higher concentration of deuterium than normal.

As the water entering the system in either of the stages flows downwardly through the cold tower countercurrently to the upwardly flowing stream of hydrogen sulfide gas, the water is progressively enriched in deuterium. Conversely, as the water continues its passage downwardly through the hot towers 12 and 26, countercurrently to the upwardly flowing hydrogen sulfide gas, it is progressively depleted of the deuterium isotope. The hydrogen sulfide gas acts as a transport fluid and circulates through the first stage in a recirculating closed loop. A portion of this recirculating gas is withdrawn and passed through the second stage as above noted. Thus, the enriched deuterium that tends to build up in the hydrogen sulfide passing upwardly through the hot tower 12 of the first stage is partially withdrawn and passed through the line 24 to be increased in concentration further during its passage upwardly through the hot tower 26. A portion of this highly enriched product than may be withdrawn if desired for further processing or the entire amount may be passed on, as illustrated, upwardly through the cold tower 28 where the enriched deuterium is transferred back to the downwardly passing cold water. That which is not extracted from the flowing gas passes out to the line 32 and back to the bottom of the cold tower 10 of the first stage where more deuterium is extracted from the flowing gas. The hydrogen sulfide gas is then withdrawn from the top of the tower 10 and recirculated.

Conversely, the water which passes downwardly through the cold tower 10 of the first stage is enriched due to its countercurrent exchange with the hydrogen sulfide gas. A portion of this water enriched in deuterium is withdrawn to the line 40 and passed downwardly through the cold tower 28 for further enrichment by countercurrent exchange. When the water reaches the bottom of the cold tower 28, it is withdrawn through the line 44 as an enriched product. That which is not withdrawn passes downwardly through the hot tower 10 where part of its deuterium is released to the hydrogen sulfide. The remaining water then passes through the line 46 back to the hot tower 12 of the first stage for additional release of the deuterium to the upwardly passing hydrogen sulfide gas. Thus, the deuterium which builds up during this two stage process is withdrawn from the base of the cold tower 10 and the top of hot tower 12 as noted and is fed to the second stage for further enrichment. From the second stage or subsequent stage the enriched product may be withdrawn for additional enrichment if required. Since the process is well known, it will not be further described except to say that under the normal process conditions the cold towers are operated in the vicinity of 30° C. and the hot towers are operated in the vicinity of 130° C. Also, it will be recognized that although in the example just described both hydrogen sulfide gas and liquid water are withdrawn from the first stage and passed through the second stage, the process can, if desired, be operated by withdrawing only gas from the first stage for passage through the second stage and recirculating water in the second stage, or alternatively, by withdrawing only water from the first stage through the second and recirculating gas in the second.

In accordance with this invention the three parameters, temperature of the hot tower or towers, relative recovery, that is the ratio of actual recovery of deuterium to the maximum recovery of deuterium attainable using an unlimited or infinite height of exchange tower, and finally the enrichment factors of the heavy water per stage are simultaneously modified in such a manner as to bring about a significant reduction in the size of the exchange sections of the towers required for a given production of heavy water from natural water.

Specifically, the relative recovery per stage is reduced from that usually employed, i.e., 93% of that theoretically obtainable to some lower value, this lower value in a preferred embodiment being approximately 80%. To obtain a recovery of 93% and at the same time a specified enrichment of four at least in the first stage using a temperature in the hot zone of 130° C., some 71 theoretical plates are required in the first stage. About half of these plates are required in the cold zone and half in the hot zone as stated in the cited articles. A theoretical plate is defined as one in which the exchanging fluids gas and water reach their equilibrium concentrations. For the hydrogen-water exchange process a theoretical plate is equivalent to about 1.4 actual plates.

By reducing the relative recovery from 93% to the preferred value of 80%, the number of theoretical plates required in the first stage to achieve an enrichment ratio of 4 (using a temperature in the hot zone of 130° C.) is only 54.2. The resulting reduction in theoretical plates required is seen to be a factor of 54.2 divided by 71 or 0.765. However, in order to maintain the same production, the reduced recovery per stage requires an increase in the cross-sectional area of the exchange tower. Specifically, the cross-sectional area must be increased by a factor of 93/80 or 1.165. The net effect on the size of the exchange towers is seen to be the product of the two factors, i.e., 0.765(1.165) or 0.89.

It may be noted at this point that although the effect as above calculated here applies to the first stage, the same approach can be taken to the design or construction of the second and succeeding stages if desired. Since, however, the first stage is the largest, it is to the first stage that most of the achievable reduction in capital cost pertains. This net reduction in the size of the exchange towers by 0.89, while achieving in itself a significant savings in capital cost, due to a reduction in the size of the exchange sections, height being reduced while diameter goes up must be balanced against added cost for feed water, gas circulation, heat exchangers and make-up heat, all added cost being occasioned by the reduced recovery of heavy water from the feed water. The fact of the matter is that these added costs tend to cancel out most if not all of the savings achieved by reducing tower volume. It is apparent that the possible improvement attained by reducing relative recovery while holding the hot zone temperature and the first stage enrichment ratio unchanged, is of little or no significance.

Alternatively, if the temperature of the hot zone is increased but at the same time the relative recovery and enrichment ratio are held constant the previously cited factor from the report DP–400 indicates that an increase of 10° C. in the temperature of the hot zone provides an increase in the productivity of a given set of exchange towers by approximately 9%. This improvement is at least partly offset by costs of additional heat and heat exchange equipment required to operate at the higher temperature. Thus, designing for a higher temperature operation without at the same time changing other parameters achieves only a relatively small reduction if any, in the capital cost of the unit. From a practical standpoint, the operating temperature for the hot zone of 130° C. would appear to be a practical optimum value as stated in the cited article by Proctor and Thayer.

We have seen that a design modification involving either of the first two parameters, i.e., hot zone temperature and relative recovery, alone does not significantly decrease the capital cost required to build a heavy water production system. A like result is obtained if only the third parameter, i.e., enrichment per stage is modified. At a relative recovery of 93%, if the enrichment per stage is either increased to 5 or decreased to 3 from the value of four which is recommended and utilized generally in the prior art, the change in size of the heat exchange sections is negligible, i.e., a reduction of 0.5%, at a ratio of 5 and an increase of 0.5% at a ratio of 3. It is thus clearly apparent that a redesign based on changing any one of the three parameters i.e., relative recovery, hot zone temperature, or enrichment per stage, while keeping the others constant has little effect upon the capital cost of the system. In other words, when taken individually the published values of 93% for relative recovery, 130° in the hot exchange zone, and an enrichment ratio per stage of 4 are optimum values or so near optimum that little significant improvement of the economy of the process design can be achieved by deviating from these established values.

According to the preferred embodiment of this invention, a substantial reduction in capital cost of the equipment required to run a heavy water extraction process utilizing chemical exchange between feed water and hydrogen sulfide can be achieved if the design procedure includes changes in two or more of the following parameters simultaneously: relative recovery, hot zone temperatures, and enrichment per stage.

EXAMPLE I

As a first example it is to be assumed that the hot zone temperature and the relative recovery are the established values of 130° C. and 93%, respectively. These values will be changed to a hot zone temperature of 145° C. and a relative recovery of 80%. Upon calculating the combined effect, one finds that the number of theoretical plates required to attain a 4–1 enrichment per stage is reduced to 47.6 as compared to 71 plates shown in the cited article by Proctor and Thayer. Thus the height of the isotope exchange sections of the tower is reduced by a factor of 47.6/71 or 0.67. Under these conditions even though the relative recovery has decreased from 93% to 80% the theoretical limiting recovery to which the 80% figure applies has increased 0.9 times 15 degrees equals 13.5%, due to the increased temperature of operation of the hot zone or hot tower, so that the net effect on recovery is 80/93 (1.135) or about 0.976 a net reduction of only 2.4%. The lower relative recovery and the higher temperature of operation permits an overall reduction in the size of the exchange sections by a factor of 0.67 divided by 0.976 or 0.686. Under these assumed conditions of Example I the added cost for heat exchange and make-up steam can readily be afforded in order to obtain the approximate 30% reduction in size of the exchange sections of the towers 10, 12, 26, and 28 which results when the process parameters are changed simultaneously.

EXAMPLE II

Further in accordance with the invention if the operating parameters just assumed in connection with Example I are maintained and in addition the enrichment ratio per stage is reduced still further saving in the capital investment may be obtained. For instance, with an enrichment ratio per stage of 4, a hot zone temperature of 145° C. and a relative recovery of 80%, the size of the exchange sections of the towers is as shown above reduced by about a factor of about 0.7 (Example I). If, however, in accordance with this example, the enrichment per stage is reduced to 3 the total of the sizes of the exchange sections is reduced further, the factor relative to the prior art now being 0.64 as opposed to 0.7 in Example I. This cost reduction in capital equipment is achieved at no penalty in cost of make-up heat or heat recovery equipment.

It is to be noted that the economic effect of changing the process parameters is most noticeable in the first stage, which is necessarily the largest. It is important therefore to apply favorable values for the various parameters in the design of the first stage. Other considerations, however, may dictate that these values, particularly the enrichment ratio, be different in the subsequent smaller stages.

In alternative embodiments of the invention, those skilled in the art will be able to derive other favorable combinations of these three parameters. These other combinations may be derived using methods of calculation similar to those set forth in the cited U.S. AEC Report DP–400. These combinations are too numerous to list. By way of example, only, however, one such combination would include a combination of hot zone temperature 145° C. along with a 70% relative recovery. If this combination of operating parameters is operated in conjunction with a system in which an enrichment per stage of 2 is utilized, a still further reduction in size of the exchange sections of the towers may be achieved. In this latter instance the required size of the exchange sections is 0.60 times that required size as described as typical of the prior art units. This figure of 0.60 compares favorably with the 0.64 factor attained by the use of the parameters set forth in Example II.

There has thus been described a novel system in which certain of the process parameters, namely, the hot zone temperature, the relative recovery, and the enrichment ratio per stage are alternative, and when modified in the proper combinations, permit substantial savings in the capital cost of a plant for producing heavy water by dual temperature exchange between hydrogen sulfide and water.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. A method of concentrating the deuterium isotope of hydrogen, said method comprising the steps of:
    chemically exchanging in at least one stage, at different temperatures less than the critical temperature of water, deuterium and hydrogen between water and hydrogen sulfide, one of said temperatures being greater than 140° C., and simultaneously limiting the recovery factor of enriched deuterium to less than about 92% of the recovery theoretically possible according to the process conditions used, thereby to increase the concentration of deuterium in said one stage by a factor.

2. A method according to claim 1 wherein said one temperature is more than 144° C. and said recovery factor is less than about 81%.

3. A method according to claim 1 wherein said one temperature is more than 144° C. and said recovery factor is less than about 71%.

4. A method according to claim 1 including the additional step of simultaneously limiting the increase in concentration of deuterium brought about by said chemical exchange to a factor of less than four in said one stage.

5. A method according to claim 4 wherein said one temperature is more than 144° C. and said recovery factor is less than about 81%.

6. A method according to claim 4 wherein said one temperature is more than 144° C. and said recovery factor is less than about 71%.

7. In the process of concentrating the deuterium isotope of hydrogen by chemically exchanging at different temperatures below the critical temperature of water, in at least one stage, deuterium and hydrogen between water and hydrogen sulfide, the improvement comprising:
    maintaining one of said temperatures higher than 140° C., and simultaneously limiting the recovery of enriched deuterium to less than about 80% of the recovery theoretically possible according to the particular process conditions, said limiting being achieved by reducing the effective plates used in the process, thereby to increase the concentration of deuterium in said one stage by a factor.

8. The improvement according to claim 7 of simultaneously limiting the increase in concentration of deuterium brought about by said chemical exchange to a factor of less than three in said one stage.

References Cited

FOREIGN PATENTS 865,706    4/1961    Great Britain _____ 23—204 R

OSCAR R. VERTIZ, Primary Examiner

H. S. MILLER, Assistant Examiner

U.S. Cl. X.R.

423—563